United States Patent
Cho et al.

(10) Patent No.: US 8,944,334 B2
(45) Date of Patent: Feb. 3, 2015

(54) INTERNAL VOLTAGE GENERATING CIRCUIT AND SMART CARD

(75) Inventors: Jong-pil Cho, Hwaseong-si (KR); Il-jong Song, Yongin-si (KR); Sang-hyo Lee, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 114 days.

(21) Appl. No.: 13/523,518

(22) Filed: Jun. 14, 2012

(65) Prior Publication Data

US 2012/0318875 A1 Dec. 20, 2012

(30) Foreign Application Priority Data

Jun. 14, 2011 (KR) ........................ 10-2011-0057603

(51) Int. Cl.
| | | |
|---|---|---|
| *G06K 19/06* | (2006.01) | |
| *G06K 19/07* | (2006.01) | |
| *G06K 19/077* | (2006.01) | |
| *G05F 1/56* | (2006.01) | |

(52) U.S. Cl.
CPC ........ *G06K 19/0715* (2013.01); *G06K 19/0723* (2013.01); *G06K 19/07769* (2013.01); *G05F 1/56* (2013.01)
USPC .......................................... 235/492; 235/487

(58) Field of Classification Search
CPC .............. G07K 7/1008; G06K 19/077; G06K 19/07749; G06K 19/0723; G06Q 20/341
USPC .................................................. 235/487, 492
See application file for complete search history.

(56) References Cited

U.S. PATENT DOCUMENTS

| | | | | | |
|---|---|---|---|---|---|
| 5,808,953 | A * | 9/1998 | Kim et al. | ...................... | 365/226 |
| 6,375,082 | B1 * | 4/2002 | Kobayashi et al. | ........... | 235/492 |
| 6,572,015 | B1 * | 6/2003 | Norton | .......................... | 235/382 |
| 6,840,455 | B2 * | 1/2005 | Norton | .......................... | 235/492 |
| 6,955,300 | B1 * | 10/2005 | Yoshigi et al. | ................. | 235/492 |
| 7,255,284 | B2 * | 8/2007 | Kim et al. | ...................... | 235/492 |
| 7,377,442 | B2 * | 5/2008 | Kim et al. | ...................... | 235/486 |
| 7,562,829 | B2 * | 7/2009 | Kim et al. | ...................... | 235/492 |
| 7,750,611 | B2 * | 7/2010 | Lee | ................ | 323/274 |
| 8,013,473 | B2 * | 9/2011 | Frew et al. | ....................... | 307/87 |
| 8,245,942 | B2 * | 8/2012 | Dischamp et al. | ............. | 235/492 |
| 8,328,098 | B2 * | 12/2012 | Kim | ................ | 235/441 |
| 8,330,499 | B2 * | 12/2012 | Hirose et al. | .................... | 327/65 |

(Continued)

FOREIGN PATENT DOCUMENTS

| | | |
|---|---|---|
| JP | 2010-086433 | 4/2010 |
| JP | 2010-140068 | 6/2010 |
| KR | 10-2006-0094376 A | 8/2006 |

*Primary Examiner* — Paultep Savusdiphol
(74) *Attorney, Agent, or Firm* — F. Chau & Associates, LLC

(57) ABSTRACT

An internal voltage generating circuit includes a first voltage application unit, a second voltage application unit, a first regulator, a second regulator, and a controller. The first and second voltage application units respectively provide a first voltage and a second voltage. The controller generates a bulk voltage, a first control signal, and a second control signal from the first and second voltages. The first regulator is enabled or disabled according to the first control signal and generates and outputs the first internal voltage based on the bulk voltage, the first voltage, and a first reference voltage. The second regulator is enabled or disabled according to the second control signal and generates and outputs the second internal voltage based on the bulk voltage, the second voltage, and a second reference voltage.

13 Claims, 9 Drawing Sheets

(56) References Cited

U.S. PATENT DOCUMENTS

| | | | |
|---|---|---|---|
| 2003/0075601 A1* | 4/2003 | Yagi et al. | 235/382 |
| 2003/0230631 A1* | 12/2003 | Tsunoda et al. | 235/492 |
| 2006/0000917 A1* | 1/2006 | Kim et al. | 235/492 |
| 2006/0186211 A1* | 8/2006 | Kim et al. | 235/492 |
| 2008/0054721 A1* | 3/2008 | Frew et al. | 307/52 |
| 2008/0093466 A1* | 4/2008 | Tsunoda et al. | 235/492 |
| 2008/0143312 A1* | 6/2008 | Lee | 323/284 |
| 2008/0185444 A1* | 8/2008 | Kim et al. | 235/492 |
| 2009/0166423 A1* | 7/2009 | Dischamp et al. | 235/449 |
| 2009/0236416 A1* | 9/2009 | Morita | 235/380 |
| 2010/0294843 A1* | 11/2010 | Kim | 235/492 |
| 2011/0042464 A1* | 2/2011 | Itay et al. | 235/492 |
| 2011/0210762 A1* | 9/2011 | Hirose et al. | 327/73 |
| 2012/0217811 A1* | 8/2012 | Mari N | 307/71 |

* cited by examiner

|  | CONTACTLESS MODE | CONTACT MODE |
|---|---|---|
| CON_1 | H | L |
| CON_2 | L | H |
| SW_1 | ON | OFF |
| SW_2 | OFF | ON |
| VBULK | VDDBR | VDDext |

INTERNAL VOLTAGE GENERATING CIRCUIT AND SMART CARD

CROSS-REFERENCE TO RELATED APPLICATIONS

This application claims priority to Korean Patent Application No. 10-2011-0057603, filed on Jun. 14, 2011, in the Korean Intellectual Property Office, the disclosure of which is incorporated by reference herein in its entirety.

TECHNICAL FIELD

Embodiments of the inventive concept relate to an internal voltage generating circuit and a smart card, and more particularly, to an internal voltage generating circuit that can be installed in, for example, a smart card.

DISCUSSION OF THE RELATED ART

Smart card, also called chip cards or integrated circuit (IC) cards, may be classified into contact cards, contactless cards, and combi-cards (or hybrid cards) depending on how the device is used. A contact card includes on its surface a contact terminal to which external power is supplied. A contactless card includes a non-contact type terminal, such as an antenna, that receives a radio frequency signal to generate a power supply voltage. A combi-card may operate as a contact card in a contact mode and as a contactless card in a contactless mode.

SUMMARY

Embodiments of the inventive concept provide an internal voltage generating circuit that can minimize the occurrence of a leakage current and generate an exact internal voltage in a contact mode or a contactless mode or when both the contact mode and the contactless mode are performed.

Embodiments of the inventive concept also provide a smart card which can minimize the occurrence of a leakage current and can operate using an exactly generated internal voltage in the contact mode or the contactless mode or when both the contact mode and the contactless mode are performed.

According to an embodiment of the inventive concept, there is provided an internal voltage generating circuit which generates and outputs a first internal voltage in a contactless mode, and generates and outputs a second internal voltage in a contact mode. The internal voltage generating circuit includes a first voltage application unit, a second voltage application unit, a controller, a first regulator, and a second regulator. The first voltage application unit applies a first voltage that is higher in the contactless mode than in the contact mode. The second voltage application unit applies a second voltage that is higher in the contact mode than in the contactless mode. The controller generates a bulk voltage, a first control signal, and a second control signal based on the first and second voltages. The first regulator is enabled or disabled according to the first control signal, and generates and outputs the first internal voltage based on the bulk voltage, the first voltage, and a first reference voltage. The second regulator is enabled or disabled according to the second control signal, and generates and outputs the second internal voltage based on the bulk voltage, the second voltage, and a second reference voltage.

The controller includes a differential amplifier for differentially amplifying the first and second voltages and outputting an amplified voltage of the amplification as the second control signal, an inverter for inverting the second control signal and outputting an inverted signal as the first control signal, and a bulk voltage generator for outputting the first voltage as the bulk voltage according to the first control signal, in the contactless mode, and outputting the second voltage as the bulk voltage according to the second control signal, in the contact mode.

The first regulator includes a first resistor unit connected between an output terminal of the internal voltage generating circuit and a ground voltage source, the first resistor unit for dividing the first internal voltage, a first differential amplifier for differentially amplifying the first reference voltage and a divided voltage of the first internal voltage, and outputting an amplified voltage, a first voltage controller for controlling the first voltage application unit and the output terminal of the internal voltage generating circuit to be connected or disconnected to/from each other according to an output signal of the first differential amplifier or the bulk voltage, and a first switch unit for enabling or disabling the first differential amplifier and the first voltage controller, and controlling the first resistor unit and the ground voltage source to be connected or disconnected to/from each other according to the first control signal.

The second regulator includes a second resistor unit connected between an output terminal of the internal voltage generating circuit and a ground voltage source, the second resistor unit for dividing the second internal voltage, a second differential amplifier for differentially amplifying the second reference voltage and a divided voltage of the second internal voltage, and outputting an amplified voltage, a second voltage controller for controlling the second voltage application unit and the output terminal of the internal voltage generating circuit to be connected or disconnected to/from each other according to an output signal of the second differential amplifier or the bulk voltage, and a second switch unit for enabling or disabling the second differential amplifier and the second voltage controller, and controlling the second resistor unit and the ground voltage source to be connected or disconnected to/from each other according to the second control signal.

The controller includes a register for storing priority information indicating whether the contact mode or the contactless mode has priority, and a signal generator for outputting the first voltage or the second voltage as the bulk voltage, based on the priority information, and generating and outputting the first and second control signals based on the first and second voltages and the priority information.

The signal generator outputs the first voltage as the bulk voltage, output the first control signal to enable the first regulator, and output the second control signal to disable the second regulator, when the contactless mode has priority and is performed, and output the second voltage as the bulk voltage, output the first control signal to disable the first regulator, and output the second control signal to enable the second regulator, when the contact mode has priority and is performed The signal generator includes a selection signal generator for generating a selection signal based on the priority information, and the first and second voltages, a differential amplifier for differentially amplifying the first and second voltages and outputting an amplified voltage, a control signal generator for selecting either a first input signal corresponding to the priority information or a second input signal corresponding to an output signal of the differential amplifier, according to the selection signal, outputting the selected signal as the second control signal, and outputting an inverted signal of the selected signal as the first control signal, and a bulk voltage generator for outputting the first voltage as the bulk voltage according to the first control signal when the contactless mode has priority and is performed, and outputting the second voltage as the bulk voltage according to the second control signal when the contact mode has priority and is performed.

According to an embodiment of the inventive concept, there is provided a smart card which operates in a contactless mode and a contact mode, the smart card including a first voltage application unit for applying a first voltage that is higher in the contactless mode than in the contact mode, a second voltage application unit for applying a second voltage that is higher in the contact mode than in the contactless mode, an internal voltage generating circuit for generating and outputting a first internal voltage in a contactless mode and generating and outputting a second internal voltage in a contact mode, based on the first and second voltages, and a memory device operating based on the first or second internal voltage. The internal voltage generating circuit includes a controller for generating a bulk voltage, a first control signal, and a second control signal based on the first and second voltages, a first regulator which is enabled or disabled according to the first control signal, the first regulator for generating and outputting the first internal voltage based on the bulk voltage, the first voltage, and a first reference voltage, and a second regulator which is enabled or disabled according to the second control signal, the first regulator for generating and outputting the second internal voltage based on the bulk voltage, the second voltage, and a second reference voltage.

BRIEF DESCRIPTION OF THE DRAWINGS

Exemplary embodiments of the inventive concept will be more clearly understood from the following detailed description taken in conjunction with the accompanying drawings in which.

DETAILED DESCRIPTION OF THE EMBODIMENTS

Figure 1:
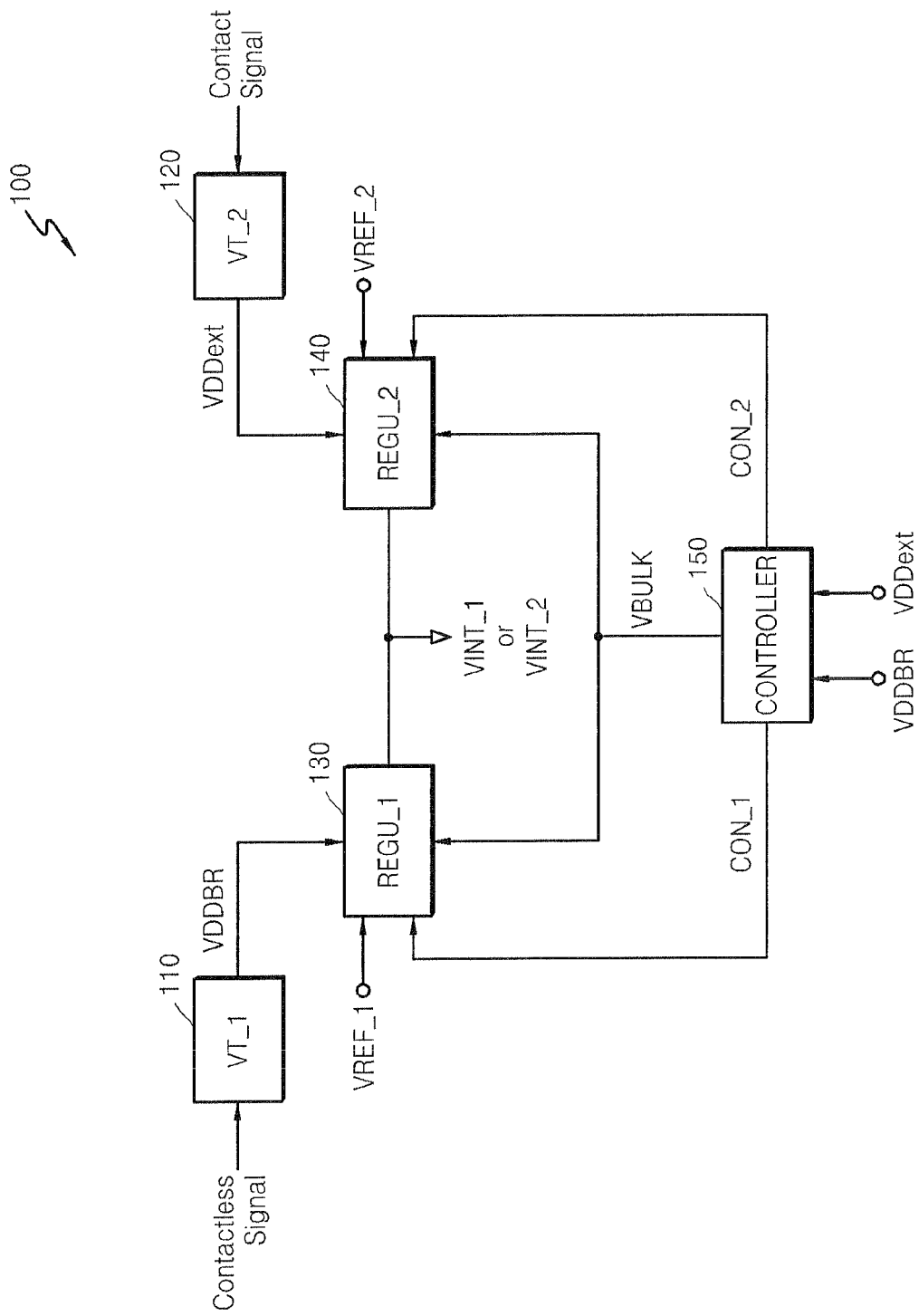
FIG. 1 is a block diagram illustrating an internal voltage generating circuit according to an embodiment of the inventive concept.

Hereinafter, exemplary embodiments of the inventive concept will be described in greater detail with reference to the accompanying drawings. Like reference numerals may denote like or similar elements throughout the specification and the drawings.

FIG. 1 is a block diagram illustrating an internal voltage generating circuit 100 according to an embodiment of the inventive concept. Referring to FIG. 1, the internal voltage generating circuit 100 includes a first voltage application unit 110, a second voltage application unit 120, a first regulator 130, a second regulator 140, and a controller 150.

The first voltage application unit 110 applies a first voltage VDDBR that is higher in a contactless mode than in a contact mode. In other words, the first voltage application unit 110 applies the first voltage VDDBR (e.g., a higher voltage) having a first level in the contactless mode, and applies the first voltage VDDBR (e.g. a lower voltage) having a second level, which is lower than the first level in the contact mode. For example, the first voltage application unit 110 is a radio frequency interface that generates the first voltage VDDBR from a non-contact signal, e.g., a radio frequency signal, which is received via a non-contact type terminal, e.g., an antenna, and then outputs the first voltage VDDBR.

The second voltage application unit 120 applies a second voltage VDDext that is higher in the contact mode than in the contactless mode. In other words, the second voltage application unit 120 applies the second voltage (e.g., a higher voltage) VDDext having a third level in the contact mode and applies the second voltage VDDext (e.g., a lower voltage) having a fourth level, which is lower than the third level, in the contactless mode. The third level is higher than the second level, and the fourth level is lower than the first level. For example, the second voltage application unit 120 is an external contact terminal that generates the second voltage VDDext from a contact signal, e.g., a signal supplied from an external power source, and then outputs the second voltage VDDext.

The controller 150 generates a bulk voltage VBULK, a first control signal CON_1, and a second control signal CON_2 from the first voltage VDDBR and the second voltage VDDext. In the contact mode or the contactless mode, the controller 150 outputs a higher voltage of the first voltage VDDBR and the second voltage VDDext as the bulk voltage VBULK. When both the contact mode and the contactless mode are performed, a voltage corresponding to the contact mode or the contactless mode selected according to priority is output as the bulk voltage VBULK. The first control signal CON_1 enables or disables the first regulator 130. The second control signal CON_2 enables or disables the second regulator 140. A structure and operation of the controller 150 according to an embodiment of the inventive concept are described below in detail with reference to FIGS. 2, 3, and 7 to 9B.

The first regulator 130 is enabled or disabled according to the first control signal CON_1 and generates a first internal voltage VINT_1 using the bulk voltage VBULK, the first voltage VDDBR, and a first reference voltage VREF_1 and then outputs the first internal voltage VINT_1. For example, in the contactless mode, the first regulator 130 is enabled according to the first control signal CON_1 and generates and outputs the first internal voltage VINT_1 using the bulk voltage VBULK, the first voltage VDDBR, and the first reference voltage VREF_1. In the contact mode, the first regulator 130 is disabled according to the first control signal CON_1.

The second regulator 140 is enabled or disabled according to the second control signal CON_2 and generates and outputs a second internal voltage VINT_2 using the bulk voltage VBULK, the second voltage VDDext, and a second reference voltage VREF_2. For example, in the contact mode, the second regulator 140 is enabled according to the second control signal CON_2 and generates and outputs the second internal voltage VINT_2 using the bulk voltage VBULK, the second voltage VDDext, and the second reference voltage VREF_2. In the contactless mode, the second regulator 140 is disabled according to the second control signal CON_2.

Structures and operations of the first and second regulators 130 and 140 according to an embodiment of the inventive concept are described below in detail with reference to FIGS. 4 to 6.

Figures 2, 3:
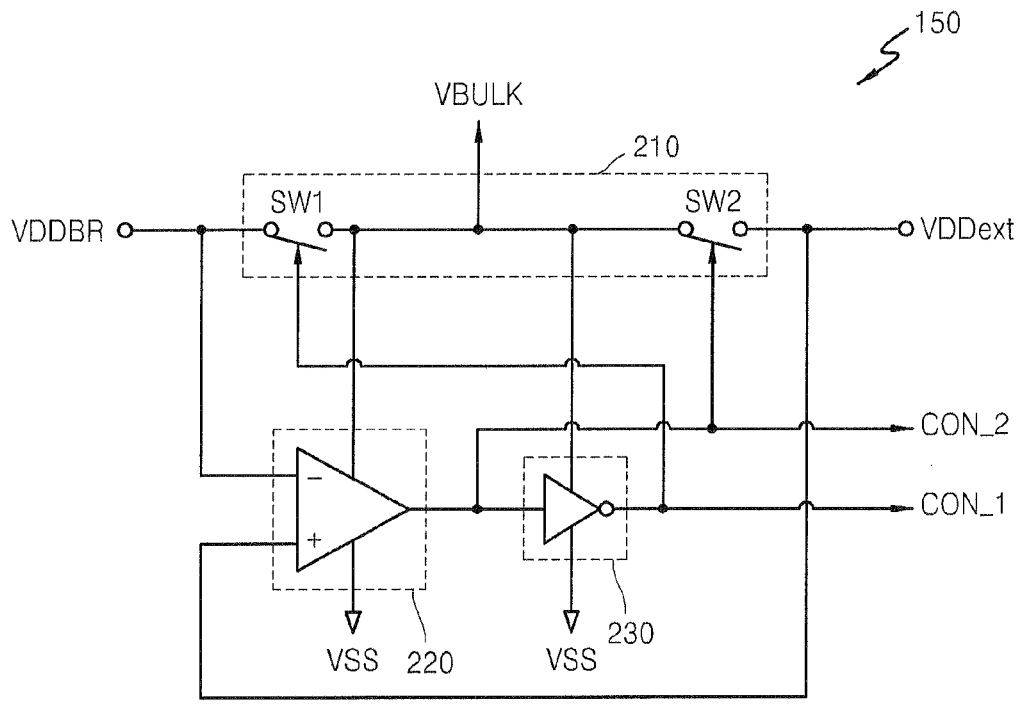
FIG. 2 is a circuit diagram illustrating a controller as illustrated in FIG. 1 according to an embodiment of the inventive concept.
FIG. 3 is a table illustrating an operation of the controller illustrated in FIG. 2, according to an embodiment of the inventive concept.

FIG. 2 is a circuit diagram illustrating the controller 150 illustrated in FIG. 1 according to an embodiment of the inventive concept. Referring to FIGS. 1 and 2, the controller 150 includes a bulk voltage generator 210, a differential amplifier 220, and an inverter 230.

The differential amplifier 220 differentially amplifies the first voltage VDDBR and the second voltage VDDext and then outputs the second control signal CON_2. The first voltage VDDBR is applied to a negative ('−') input terminal of the differential amplifier 220, and the second voltage VDDext is applied to a positive ('+') input terminal of the differential amplifier 220. However, the embodiments of the inventive concept are not limited thereto, and alternatively, the same effect as an effect obtained when the first voltage VDDBR and the second voltage VDDext are respectively applied to the '−' input terminal an the '+' input terminal of the differential amplifier 220 is also obtained through a circuit modified so that the first voltage VDDBR and the second voltage VDDext are respectively applied to the '+' input terminal and the '−' input terminal of the differential amplifier 220. The differential amplifier 220 outputs the second control signal CON_2 having a voltage that is equal to the bulk voltage VBULK or a ground voltage VSS.

The inverter 230 inverts the second control signal CON_2 received from the differential amplifier 220 and then outputs the first control signal CON_1. The inverter 230 outputs the first control signal CON_1 having a voltage that is equal to the ground voltage VSS when the voltage of the second control signal CON_2 is equal to the bulk voltage VBULK and outputs the first control signal CON_1 having a voltage that is equal to the bulk voltage VBULK when the voltage of the second control signal CON_2 is equal to the ground voltage VSS.

The bulk voltage generator 210 outputs the first voltage VDDBR or the second voltage VDDext as the bulk voltage VBULK according to the first control signal CON_1 received from the inverter 230 and the second control signal CON_2 received from the differential amplifier 220. The bulk voltage generator 210 includes a first switch SW1 and a second switch SW2. The first switch SW1 controls the first voltage application unit 110 and an output terminal of the bulk voltage generator 210 to be connected or disconnected to/from each other according to the first control signal CON_1. The second switch SW2 controls the second voltage application unit 120 and the output terminal of the bulk voltage generator 210 to be connected or disconnected to/from each other according to the second control signal CON_2.

For example, in the contactless mode, the first switch SW1 connects the first voltage application unit 110 to the output terminal of the bulk voltage generator 210 according to the first control signal CON_1, and the second switch SW2 disconnects the second voltage application unit 120 from the output terminal of the bulk voltage generator 210 according to the second control signal CON_2. As a consequence, the bulk voltage generator 210 outputs the first voltage VDDBR as the bulk voltage VBULK. As another example, in the contact mode, the first switch SW1 disconnect the first voltage application unit 110 from the output terminal of the bulk voltage generator 210 according to the first control signal CON_1, and the second switch SW2 connects the second voltage application unit 120 to the output terminal of the bulk voltage generator 210 according to the second control signal CON_2. As a consequence, the bulk voltage generator 210 outputs the second voltage VDDext as the bulk voltage VBULK.

FIG. 3 is a table illustrating an operation of the controller 150 illustrated in FIG. 2 according to an embodiment of the inventive concept. An operation of the controller 150 in the contactless mode and an operation of the controller 150 in the contact mode are described with reference to FIGS. 1 to 3.

In the contactless mode, the first voltage VDDBR has a first level, and the second voltage VDDext has a fourth level that is lower than the first level. The second control signal CON_2 output from the differential amplifier 220 has a low level (L), and the first control signal CON_1 output from the inverter 230 has a high level (H). The first switch SW_1 is 'on' according to the first control signal CON_1 having the high level (H) and connects the first voltage application unit 110 to the output terminal of the bulk voltage generator 210. The second switch SW_2 is 'off' according to the second control signal CON_2 having the logic level (L) and disconnects the second voltage application unit 120 from the output terminal of the bulk voltage generator 210. As a consequence, the bulk voltage generator 210 outputs the bulk voltage VBULK that is equal to the first voltage VDDBR.

In the contact mode, the first voltage VDDBR has a second level, and the second voltage VDDext has a third level that is higher than the second level. The second control signal CON_2 output from the differential amplifier 220 has the high level (H), and the first control signal CON_1 output from the inverter 230 has the low level (L). The first switch SW_1 is 'off' according to the first control signal CON_1 having the low level (L) and disconnects the first voltage application unit 110 from the output terminal of the bulk voltage generator 210. The second switch SW_2 is 'on' according to the second control signal CON_2 having the high level (H) and connects the second voltage application unit 120 to the output terminal of the bulk voltage generator 210. As a consequence, the bulk voltage generator 210 outputs the bulk voltage VBULK that is equal to the second voltage VDDext.

According to an embodiment, the high level (H) of the first control signal CON_1 or the second control signal CON_2 is equal to a level of the bulk voltage VBULK, and the low level (L) of the first control signal CON_1 or the second control signal CON_2 is equal to a level of the ground voltage VSS.

Figure 4:
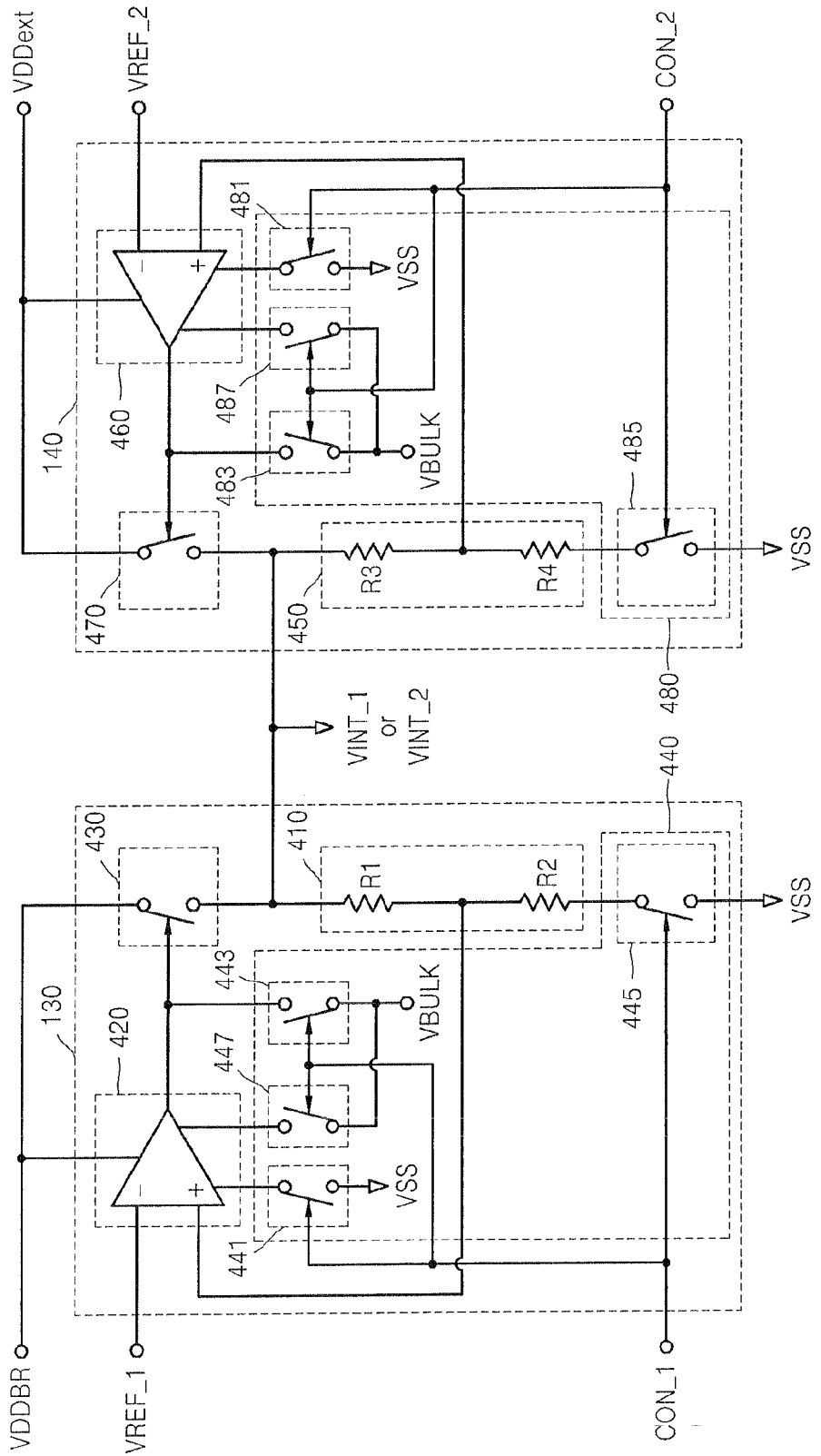
FIG. 4 is a circuit diagram illustrating a first regulator and a second regulator as illustrated in FIG. 1 according to an embodiment of the inventive concept.

FIG. 4 is a circuit diagram illustrating the first regulator 130 and the second regulator 140 illustrated in FIG. 1 according to an embodiment of the inventive concept. Referring to FIGS. 1 to 4, the first regulator 130 includes a first resistor unit 410, a first differential amplifier 420, a first voltage controller 430, and a first switch unit 440.

The first resistor unit 410 is connected between an output terminal of the internal voltage generating circuit 100 and a ground voltage VSS source and divides the first internal voltage VINT_1 output from the first regulator 130. Although FIG. 4 illustrates that the first resistor unit 410 is connected between the output terminal of the internal voltage generating circuit 100 and the first switch unit 440, the first resistor unit 410 may be referred to as being connected between the output terminal of the internal voltage generating circuit 100 and the ground voltage VSS source since a third switch 445 included in the first switch unit 440 controls connection between the first resistor unit 410 and the ground voltage VSS source. The first resistor unit 410 includes a first resistor R1 and a second resistor R2 that are connected in series. The first resistor unit 410 divides the first internal voltage VINT_1 according to a ratio of a resistance value of the first resistor R1 to a resistance value of the second resistor R2 and outputs a divided voltage.

The first differential amplifier 420 differentially amplifies a first reference voltage VREF_1 and the divided voltage received from the first resistor unit 410, and then outputs an amplified voltage. The first reference voltage VREF_1 is applied to a negative ('−') input terminal of the first differential amplifier 420, and the divided voltage of the first internal voltage VINT_1 is applied to a positive ('+') input terminal of the first differential amplifier 420. However, the embodiments of the inventive concept are not limited thereto, and the same effect as an effect obtained when the first reference voltage VREF_1 and the divided voltage of the first internal voltage VINT_1 are respectively applied to the '−' input terminal and the '+' input terminal of the first differential amplifier 420 is obtained through a circuit modified so that that the first reference voltage VREF_1 and the divided voltage of the first internal voltage VINT_1 are respectively applied to the '+' input terminal and the '−' input terminal of the first differential amplifier 420. The first differential amplifier 420 outputs a signal having a voltage that is equal to a bulk voltage VBULK or a ground voltage VSS.

The first switch unit 440 enables or disables the first differential amplifier 420 and the first voltage controller 430 and controls the first resistor unit 410 and the ground voltage VSS source to be connected or disconnected to/from each other according to a first control signal CON_1.

The first switch unit 440 includes a first switch 441, a second switch 443, the third switch 445, and a fourth switch 447. The first switch 441 controls the first differential amplifier 420 and the ground voltage VSS source to be connected or disconnected to/from each other according to the first control signal CON_1. The second switch 443 controls the bulk voltage VBULK to be applied or not to be applied to the first voltage controller 430 according to the first control signal CON_1. The third switch 445 controls the first resistor unit 410 and the ground voltage VSS source to be connected or disconnected to/from each other according to the first control signal CON_1. The fourth switch 447 enables or disables the first differential amplifier 420 according to the first control signal CON_1. For example, in the contactless mode, the first and third switches 441 and 445 are 'on', and the second and fourth switches 443 and 447 are 'off' according to the first control signal CON_1. As another example, in the contact mode, the first and third switches 441 and 445 are 'off', and the second and fourth switches 443 and 447 are 'on' according to the first control signal CON_1. An operation of the first switch unit 440 according to an embodiment of the inventive concept is described below in detail with reference to FIG. 5.

The first voltage controller 430 controls the first voltage application unit 110 and the output terminal of the internal voltage generating circuit 100 to be connected or disconnected to/from each other according to the output signal of the first differential amplifier 420 or the bulk voltage VBULK. For example, in the contactless mode, the first voltage controller 430 is 'on' or 'off' according to the output signal of the first differential amplifier 420. In other words, when the divided voltage of the first internal voltage VINT_1 is higher than the first reference voltage VREF_1, the first differential amplifier 420 outputs a signal having a voltage that is equal to a first voltage VDDBR, and the first voltage controller 430 is thus 'off'. When the divided voltage of the first internal voltage VINT_1 is lower than the first reference voltage VREF_1, the first differential amplifier 420 outputs a signal having a voltage that is equal to the ground voltage VSS and the first voltage controller 430 is thus 'on'. The first differential amplifier 420 repeats the operation described above and controls the first internal voltage VINT_1. As another example, in the contact mode, the first voltage controller 430 is 'off' according to the bulk voltage VBULK applied via the second switch 443 that is 'on'. An operation of the first voltage controller 430 according to an embodiment of the inventive concept is described below in detail with reference to FIG. 5.

Referring to FIGS. 1 to 4, the second regulator 140 includes a second resistor unit 450, a second differential amplifier 460, a second voltage controller 470, and a second switch unit 480. The structure of the second regulator 140 is the same or substantially the same as the structure of the first regulator 130 except for signals supplied to the constitutional elements of the second regulator 140.

The second resistor unit 450 is connected between the output terminal of the internal voltage generating circuit 100 and the ground voltage VSS source and divides the second internal voltage VINT_2 output from the second regulator 140. Although FIG. 4 illustrates that the second resistor unit 450 is connected between the output terminal of the internal voltage generating circuit 100 and the second switch unit 480, the second resistor unit 450 may be referred to as being connected between the output terminal of the internal voltage generating circuit 100 and the ground voltage VSS source since a seventh switch 485 included in the second switch unit 480 controls connection between the second resistor unit 450 and the ground voltage VSS source. The second resistor unit 450 includes a third resistor R3 and a fourth resistor R4 that are connected in series. The second resistor unit 410 divides the second internal voltage VINT_2 according to a ratio of a resistance value of the third resistor R3 to a resistance value of the fourth resistor R4, and outputs a divided voltage of the second internal voltage VINT_2.

The second differential amplifier 460 differentially amplifies a second reference voltage VREF_2 and the divided voltage of the second internal voltage VINT_2, which is received from the second resistor unit 450, and then outputs an amplified voltage of the amplification. The second reference voltage VREF_2 is applied to a negative ('−') input terminal of the second differential amplifier 460, and the divided voltage of dividing the second internal voltage VINT_2 is applied to a positive ('+') input terminal of the second differential amplifier 460. However, the embodiments of the inventive concept are not limited thereto, and the same effect as an effect obtained when the second reference voltage VREF_2 and the divided voltage of the second internal voltage VINT_2 are respectively applied to the '−' input terminal and the '+' input terminal of the second differential amplifier 460 is obtained through a circuit modified so that the second reference voltage VREF_2 and the divided voltage of the second internal voltage VINT_2 are respectively applied to the '+' input terminal and the '−' input terminal of the second differential amplifier 460. The second differential amplifier 460 outputs a signal having a voltage that is equal to the bulk voltage VBULK or the ground voltage VSS.

The second switch unit 480 enables or disables the second differential amplifier 460 and the second voltage controller 470 and controls the second resistor unit 450 and the ground voltage VSS source to be connected or disconnected to/from each other according to a second control signal CON_2.

The second switch unit 480 includes a fifth switch 481, a sixth switch 483, a seventh switch 485, and an eighth switch 487. The fifth switch 481 controls the second differential amplifier 460 and the ground voltage VSS source to be connected or disconnected to/from each other according to the second control signal CON_2. The sixth switch 483 controls the bulk voltage VBULK to be applied or not to be applied to the second voltage controller 470 according to the second control signal CON_2. The seventh switch 485 controls the second resistor unit 450 and the ground voltage VSS source to be connected or disconnected to/from each other according to the second control signal CON_2. The eighth switch 487 enables or disables the second differential amplifier 460 according to the second control signal CON_2. For example, in the contact mode, the fifth and seventh switches 481 and 485 are 'on', and the sixth and eighth switches 483 and 487 are 'off' according to the second control signal CON_2. As another example, in the contactless mode, the fifth and seventh switches 481 and 485 are 'off', and the sixth and eighth switches 483 and 487 are 'on' according to the second control signal CON_2. An operation of the second switch unit 480 according to an embodiment of the inventive concept is described below in detail with reference to FIG. 6.

The second voltage controller 470 controls the second voltage application unit 120 and the output terminal of the internal voltage generating circuit 100 to be connected or disconnected to/from each other according to the output signal of the second differential amplifier 460 or the bulk voltage VBULK. For example, in the contact mode, the second voltage controller 470 is 'on' or 'off' according to the output signal of the second differential amplifier 460. In other words, when the divided voltage of the second internal voltage VINT_2 is higher than the second reference voltage VREF_2, the second differential amplifier 460 outputs a signal having a voltage that is equal to a second voltage VDDext and the second voltage controller 470 is thus 'off'. When the divided voltage of the second internal voltage VINT_2 is lower than the second reference voltage VREF_2, the second differential amplifier 460 outputs a signal having a voltage that is equal to the ground voltage VSS and the second voltage controller 470 is thus 'on'. The second differential amplifier 460 repeats the operation described above and controls the second internal voltage VINT_2. As another example, in the contactless mode, the second voltage controller 470 is 'off' according to the bulk voltage VBULK applied via the sixth switch 483 that is 'on'. An operation of the second voltage controller 470 according to an embodiment of the inventive concept is described below in detail with reference to FIG. 6.

Figure 5:
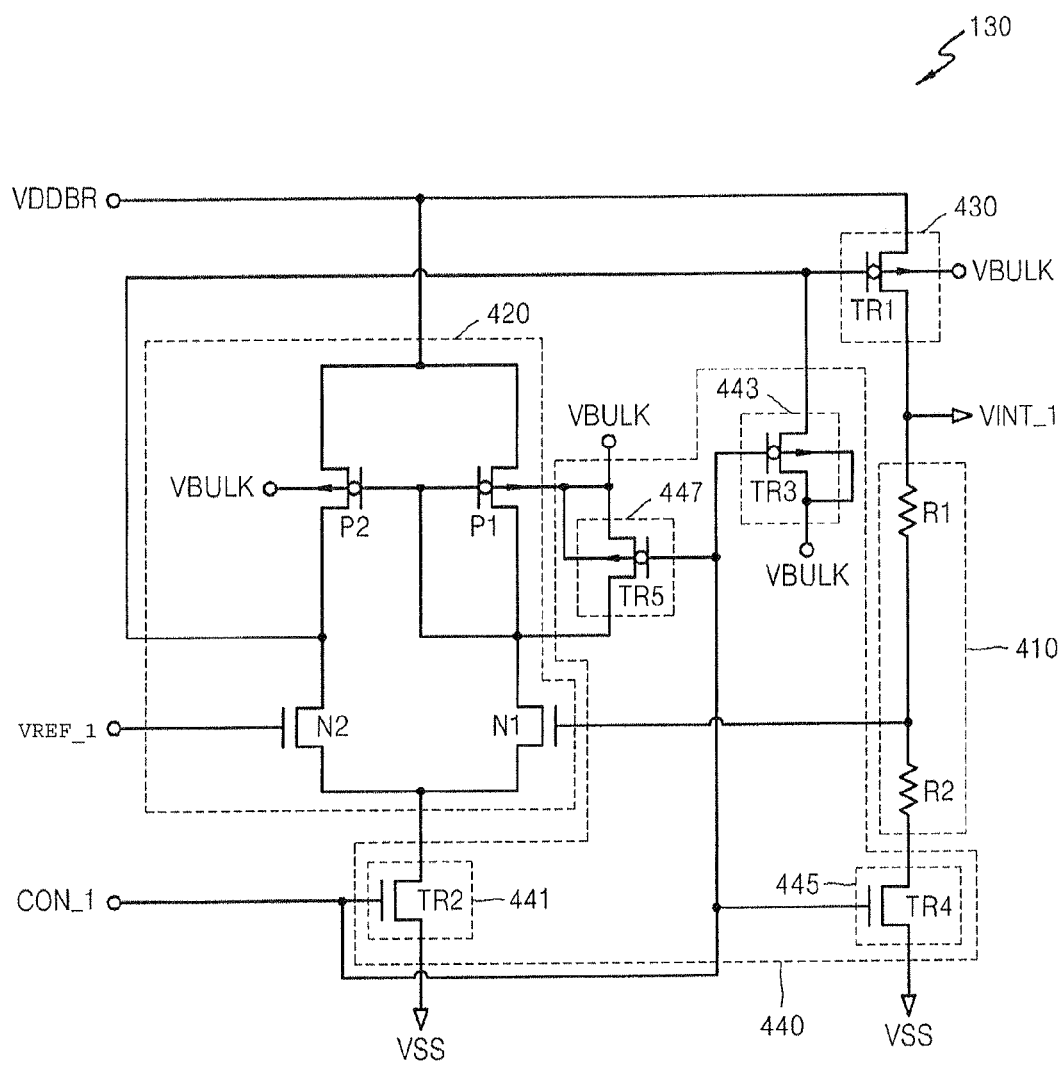
FIG. 5 is a circuit diagram illustrating the first regulator illustrated in FIG. 1 or 4.

FIG. 5 is a circuit diagram illustrating the first regulator 130 illustrated in FIG. 1 or 4 in detail. FIG. 5 illustrates an operation of the first regulator 130 when the controller 150 of FIG. 1 has the structure as illustrated in FIG. 2 and outputs the first and second control signals CON_1 and CON_2 as described above with reference to FIGS. 2 and 3.

Referring to FIGS. 1 to 5, the first regulator 130 includes the first resistor unit 410, the first differential amplifier 420, the first voltage controller 430, and the first switch unit 440. The first resistor unit 410, the first differential amplifier 420, the first voltage controller 430, and the first switch unit 440 have been described above with reference to FIG. 4.

The first differential amplifier 420 includes a first PMOS transistor P1, a second PMOS transistor P2, a first NMOS transistor N1, and a second NMOS transistor N2. The first PMOS transistor P1 has a first terminal to which a first voltage VDDBR is applied, a second terminal and a gate that are connected, and a bulk region to which a bulk voltage VBULK is applied. The second PMOS transistor P2 has a first terminal to which the first voltage VDDBR is applied, a second terminal connected to the output terminal of the first differential amplifier 420, a gate connected to the gate of the first PMOS transistor P1, and a bulk region to which the bulk voltage VBULK is applied. The first NMOS transistor N1 has a first terminal connected to the second terminal of the first PMOS transistor P1, a second terminal connected to the first switch 441, and a gate to which a divided voltage of a first internal voltage VINT_1 is applied. The second NMOS transistor N2 has a first terminal connected to the output terminal of the first differential amplifier 420, a second terminal connected to the first switch 441, and a gate to which the first reference voltage VREF_1 is applied.

The first voltage controller 430 includes a first MOS transistor TR1. The first MOS transistor TR1 includes a first terminal and a second terminal that are respectively connected to the first voltage application unit 110 and the output terminal of the internal voltage generating circuit 100. The output signal of the first differential amplifier 420 or the bulk voltage VBULK is applied to a gate of the first MOS transistor TR1, and the bulk voltage VBULK is applied to a bulk region of the first MOS transistor TR1.

The first switch 441 includes a second MOS transistor TR2. A first terminal of the second MOS transistor TR2 is connected to the second terminals of the first and second NMOS transistors N1 and N2. The ground voltage VSS is applied to a second terminal of the second MOS transistor TR2, and the first control signal CON_1 is supplied to a gate of the second MOS transistor TR2. The second switch 443 includes a third MOS transistor TR3. A first terminal of the third MOS transistor TR3 is connected to the gate of the first MOS transistor TR1 and the output terminal of the first differential amplifier 420. The bulk voltage VBULK is applied to a second terminal of the third MOS transistor TR3. The first control signal CON_1 is supplied to a gate of the third MOS transistor TR3, and the bulk voltage VBULK is applied to a bulk region of the third MOS transistor TR3. The third switch 445 includes a fourth MOS transistor TR4. A first terminal of the fourth MOS transistor TR4 is connected to the second resistor R2 of the first resistor unit 410. The ground voltage VSS is applied to a second terminal of the fourth MOS transistor TR4, and the first control signal CON_1 is supplied to a gate of the fourth MOS transistor TR4. The fourth switch 447 includes a fifth MOS transistor TR5. A first terminal of the fifth MOS transistor TR5 is connected to the gates of the first and second PMOS transistor P1 and P2. The bulk voltage VBULK is applied to a second terminal of the fifth MOS transistor TR5, the first control signal CON_1 is supplied to a gate of the fifth MOS transistor TR5, and the bulk voltage VBULK is applied to a bulk region of the fifth MOS transistor TR5.

An operation of the first regulator 130 when the first control signal CON_1 and the bulk voltage VBULK are generated as illustrated in the table of FIG. 3 is described.

In the contactless mode, the first control signal CON_1 has the bulk voltage VBULK having a high level (H), which is equal to the first voltage VDDBR. The second and fourth MOS transistors TR2 and TR4 are 'on', and the third and fifth MOS transistors TR3 and TR5 are 'off'. The first differential amplifier 420 is enabled and normally operates, outputs the first voltage VDDBR when the first internal voltage VINT_1 is higher than the first reference voltage VREF_1, and outputs the ground voltage VSS when the first internal voltage VINT_1 is lower than the first reference voltage VREF_1. The first MOS transistor TR1 is 'on' and increases the first internal voltage VINT_1 when the first differential amplifier 420 outputs the first voltage VDDBR, and is 'off' and keeps the first internal voltage VINT_1 at a constant level when the first differential amplifier 420 outputs the ground voltage VSS. For example, the first MOS transistor TR1 controls a channel of the first MOS transistor TR1 according to a voltage of an output signal of the first differential amplifier 420 to adjust the first internal voltage VINT_1. The first regulator 130 adjusts the first internal voltage VINT_1 as described above.

In the contact mode, the first control signal CON_1 has a voltage of a low level (L), e.g., the ground voltage VSS. The second and fourth MOS transistors TR2 and TR4 are 'off' and the third and fifth MOS transistors TR3 and TR5 are 'on'. Then, the second MOS transistor TR2 is 'off' and disables the first differential amplifier 420, and the bulk voltage VBULK, which is equal to the second voltage VDDext, is applied to the gates of the first and second PMOS transistors P1 and P2 to keep the first and second PMOS transistors P1 and P2 in an 'off' state, thereby preventing the first voltage VDDBR from being applied to the gate of the first MOS transistor TR1 via the first and second PMOS transistors P1 and P2. The third MOS transistor TR3 is 'on' to apply the bulk voltage VBULK, which is equal to the second voltage VDDext, to the gate of the first MOS transistor TR1, thereby allowing the first MOS transistor TR1 to be 'off'. The first regulator 130 can prevent the first internal voltage VINT_1 from being generated as described above.

As illustrated in FIG. 5, the first, third, and fifth MOS transistors TR1, TR3, and TR5 may be PMOS transistors, and the second and fourth MOS transistors TR2 and TR4 may be NMOS transistors. A leakage current can be prevented from being generated in the first, third, and fifth MOS transistors TR1, TR3, and TR5 by applying the bulk voltage VBULK to the bulk regions of the transistors TR1, TR2, and TR5. When in the contact mode, the first regulator 130 is 'off' and the second regulator 140 outputs the second internal voltage VINT_2, a leakage current can be prevented from flowing through the bulk region of the first MOS transistor TR1 via an output terminal of the first regulator 130 by applying the bulk voltage VBULK to the bulk region of the first MOS transistor TR1.

Figure 6:
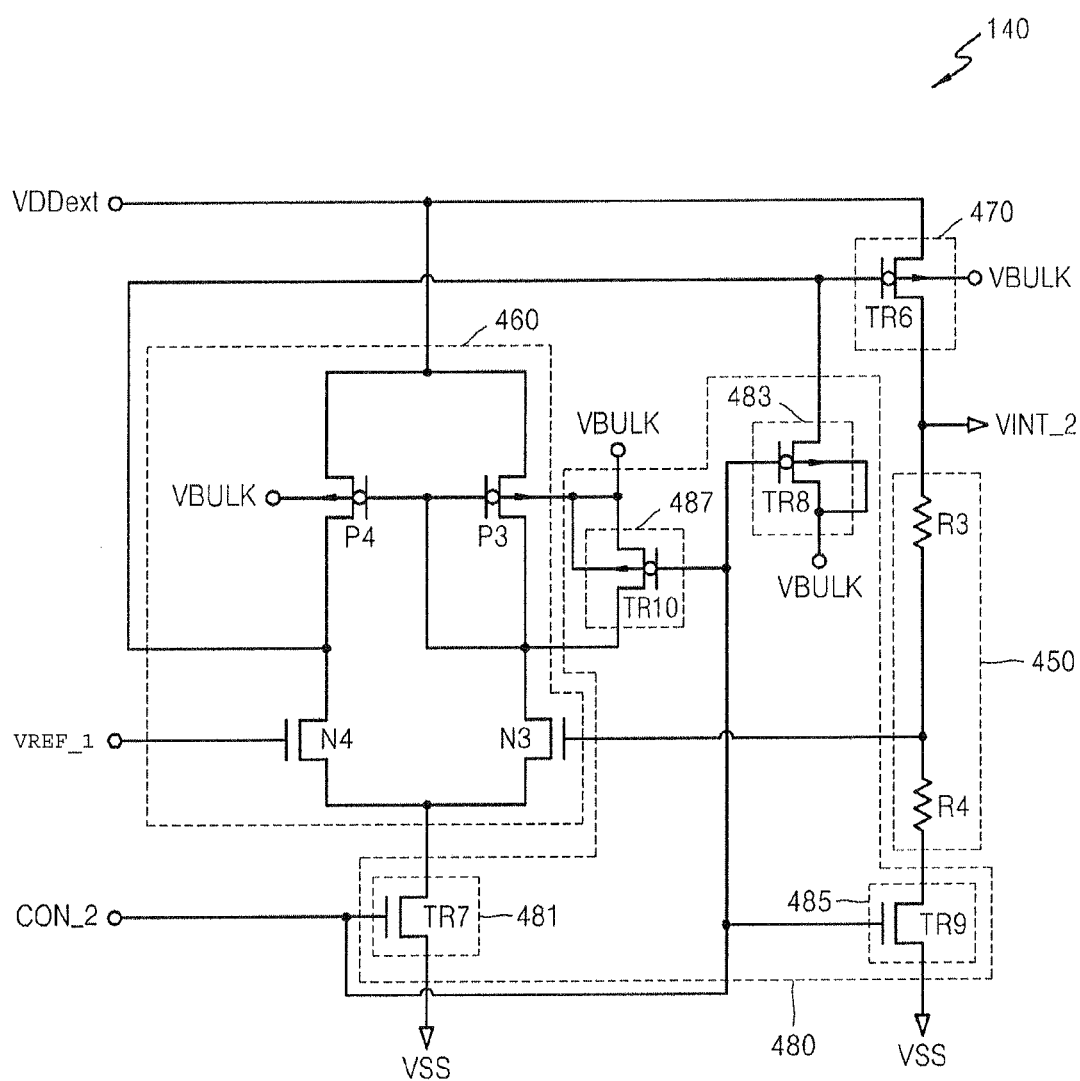
FIG. 6 is a circuit diagram illustrating the second regulator illustrated in FIG. 1 or 4.

FIG. 6 is a circuit diagram illustrating in greater detail the second regulator 140 illustrated in FIG. 1 or 4. FIG. 6 illustrates an operation of the second regulator 140 when the controller 150 of FIG. 1 has the structure as illustrated in FIG. 2 and outputs the first and second control signals CON_1 and CON_2 as described above with reference to FIGS. 2 and 3.

Referring to FIGS. 1 to 6, the second regulator 140 includes the second resistor unit 450, the second differential amplifier 460, the second voltage controller 470, and the second switch unit 480. The second resistor unit 450, the second differential amplifier 460, the second voltage controller 470, and the second switch unit 480 have been described above with reference to FIG. 4.

The second differential amplifier 460 includes a third PMOS transistor P3, a fourth PMOS transistor P4, a third NMOS transistor N3, and a fourth NMOS transistor N4. The third PMOS transistor P3 has a first terminal to which the second voltage VDDext is applied, a second terminal and a gate that are connected to each other, and a bulk region to which the bulk voltage VBULK is applied. The fourth PMOS transistor P4 has a first terminal to which the second voltage VDDext is applied, a second terminal connected to the output terminal of the second differential amplifier 460, a gate connected to the gate of the third PMOS transistor P3, and a bulk region to which the bulk voltage VBULK is applied. The third NMOS transistor N3 has a first terminal connected to the second terminal of the third PMOS transistor P3, a second terminal connected to the fifth switch 481, and a gate to which a divided voltage of the second internal voltage VINT_2 is applied. The fourth NMOS transistor N4 has a first terminal connected to the output terminal of the second differential amplifier 460, a second terminal connected to the fifth switch 481, and a gate to which the second reference voltage VREF_2 is applied.

The second voltage controller 470 includes a sixth MOS transistor TR6. A first terminal and a second terminal of the sixth MOS transistor TR are respectively connected to the second voltage application unit 120 and the output terminal of the internal voltage generating circuit 100. An output signal of the second differential amplifier 460 or the bulk voltage VBULK is applied to a gate of the sixth MOS transistor TR, and a bulk region to which the bulk voltage VBULK is applied of the sixth MOS transistor TR.

The fifth switch 481 includes a seventh MOS transistor TR7. A first terminal of the seventh MOS transistor TR7 is connected to the second terminals of the third and fourth NMOS transistors N3 and 4. The ground voltage VSS is applied to a second terminal of the seventh MOS transistor TR7, and the second control signal CON_2 is supplied to a gate of the seventh MOS transistor TR7. The sixth switch 483 includes an eighth MOS transistor TR8 A first terminal of the eighth MOS transistor TR8 is connected to the gate of the sixth MOS transistor TR6 and the output terminal of the second differential amplifier 460. The bulk voltage VBULK is applied to a second terminal of the eighth MOS transistor TR8, the second control signal CON_2 is supplied to a gate of the eighth MOS transistor TR8, and the bulk voltage VBULK is applied to a bulk region of the eighth MOS transistor TR8. The seventh switch 485 includes a ninth MOS transistor TR9. A first terminal of the ninth MOS transistor TR9 is connected to the fourth resistor R4 of the second resistor unit 450. The ground voltage VSS is applied to a second terminal of the ninth MOS transistor TR9, and the second control signal CON_2 is supplied to a gate of the ninth MOS transistor TR9. The eighth switch 487 includes a tenth MOS transistor TR10. A first terminal of the tenth MOS transistor TR10 is connected to the gates of the third and fourth PMOS transistor P3 and P4. The bulk voltage VBULK is applied to a second terminal of the tenth MOS transistor TR10, the second control signal CON_2 is supplied to a gate of the tenth MOS transistor TR10, and the bulk voltage VBULK is applied to a bulk region of the tenth MOS transistor TR10.

An operation of the second regulator 140 when the second control signal CON_2 and the bulk voltage VBULK are generated as illustrated in the table of FIG. 3 is described.

In the contact mode, the second control signal CON_2 has the bulk voltage VBULK having a high level (H), which is equal to the second voltage VDDext. The seventh and ninth MOS transistors TR7 and TR9 are 'on', and the eighth and tenth MOS transistors TR8 and TR10 are 'off'. The second differential amplifier 460 normally operates, outputs the second voltage VDDext when the second internal voltage VINT_2 is higher than the second reference voltage VREF_2, and outputs the ground voltage VSS when the second internal voltage VINT_2 is lower than the second reference voltage VREF_2. The sixth MOS transistor TR6 is 'on' and increases the second internal voltage VINT_2 when the second differential amplifier 460 outputs the second voltage VDDext, and the sixth MOS transistor TR6 is 'off' and keeps the second internal voltage VINT_2 at a constant level when the second differential amplifier 460 outputs the ground voltage VSS. For example, the sixth MOS transistor TR6 controls a channel of the transistor TR6 according to a voltage of an output signal of the second differential amplifier 460 to adjust the second internal voltage VINT_2. The second internal voltage VINT_2 may be adjusted as described above.

In the contactless mode, the second control signal CON_2 has a voltage of a low level (L), e.g., the ground voltage VSS.

The seventh and ninth MOS transistors TR7 and TR9 are 'off', and the eighth and tenth MOS transistors TR8 and TR10 are 'on'. The seventh MOS transistor TR7 is 'off' to disable the second differential amplifier 460 and the bulk voltage VBULK, which is equal to the first voltage VDDBR, is applied to the gates of the third and fourth PMOS transistors P3 and P4 to maintain the third and fourth PMOS transistors P3 and P4 in an 'off' state, thereby preventing the second voltage VDDext from being applied to the gate of the sixth MOS transistor TR6 via the third and fourth PMOS transistors P3 and P4. The eighth MOS transistor TR8 is 'on' to apply the bulk voltage VBULK, which is equal to the first voltage VDDBR, to the gate of the sixth MOS transistor TR6, thereby allowing the sixth MOS transistor TR6 to be 'off'. The second internal voltage VINT_2 can be prevented from being generated as described above.

As illustrated in FIG. 6, the sixth, eighth, and tenth MOS transistors TR6, TR8, and TR10 may be PMOS transistors, and the seventh and ninth MOS transistors TR7 and TR9 may be NMOS transistors. A leakage current can be prevented from being generated in the sixth, eighth, and tenth MOS transistors TR6, TR8, and TR10 by applying the bulk voltage VBULK to the bulk regions of the transistors TR6, TR8, and TR10. When in the contactless mode, the second regulator 140 is 'off' and the first regulator 130 outputs the first internal voltage VINT_1, a leakage current can be prevented from flowing through the bulk region of the sixth MOS transistor TR6 via the output terminal of the second regulator 140 by applying the bulk voltage VBULK to the bulk region of the sixth MOS transistor TR6.

Figure 7:
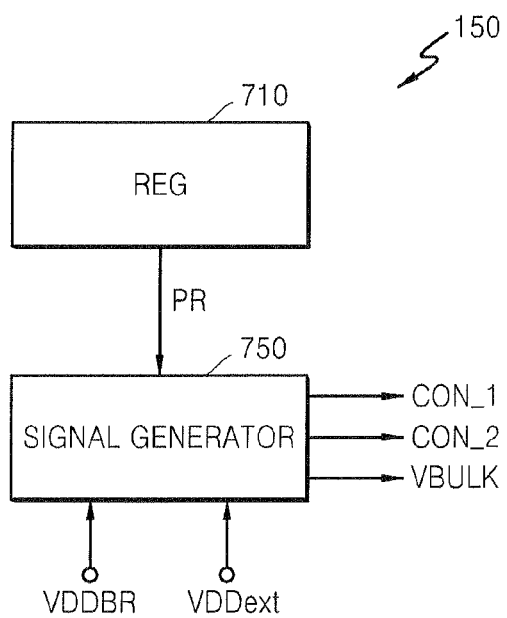
FIG. 7 is a block diagram illustrating the controller illustrated in FIG. 1 according to an embodiment of the inventive concept.

FIG. 7 is a block diagram illustrating the controller 150 illustrated in FIG. 1 according to an embodiment of the inventive concept. Referring to FIGS. 1, 4, and 7, the controller 150 include a register 710 and a signal generator 750.

The register 710 stores priority information PR indicating whether the contact mode or the contactless mode has priority. For example, the priority information PR indicates that the contact mode is to be performed or that the contactless mode is to be performed when both the contact mode and the contactless mode are performed.

The signal generator 750 outputs a first voltage VDDBR or a second voltage VDDext as a bulk voltage VBULK based on the priority information PR. The signal generator 750 generates and outputs a first control signal CON_1 and a second control signal CON_2 based on the first voltage VDDBR, the second voltage VDDext, and the priority information PR. For example, when the contactless mode has priority and is performed, the signal generator 750 outputs the first voltage VDDBR as the bulk voltage VBULK, generates and outputs the first control signal CON_1 to enable the first regulator 130, and generates and outputs the second control signal CON_2 to enable the second regulator 140. As another example, when the contact mode has priority and is performed, then the signal generator 750 outputs the second voltage VDDext as the bulk voltage VBULK, generates and outputs the first control signal CON_1 to disable the first regulator 130, and generates and outputs the second control signal CON_2 to enable the second regulator 140.

A structure and operation of the signal generator 750 according to an embodiment of the inventive concept is described in detail with reference to FIGS. 8, 9A, and 9B.

Figure 8:
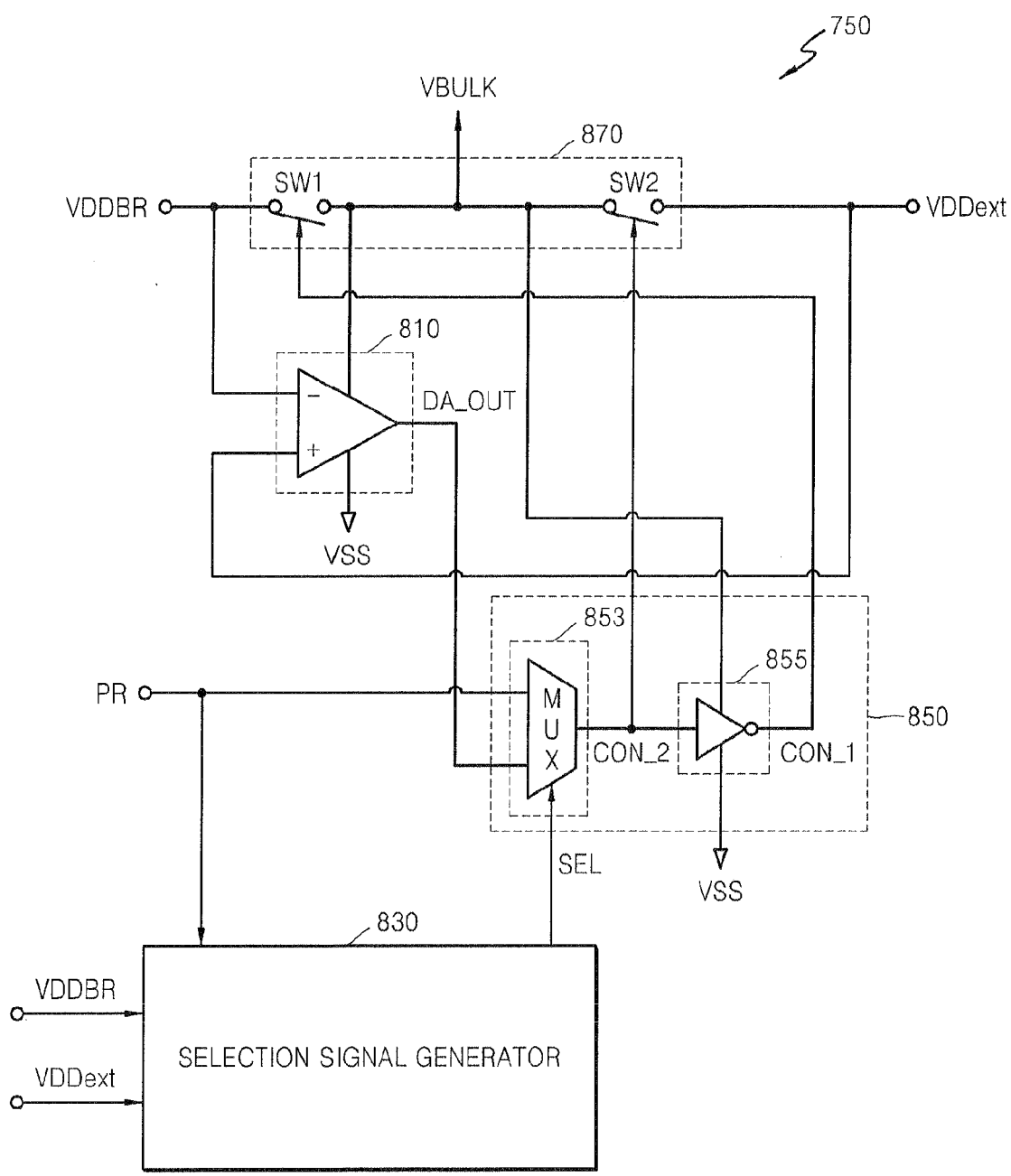
FIG. 8 is a circuit diagram illustrating a signal generator as illustrated in FIG. 7 according to an embodiment of the inventive concept.

FIG. 8 is a circuit diagram of the signal generator 750 illustrated in FIG. 7, according to an embodiment of the inventive concept. Referring to FIGS. 1 and 4 to 8, the signal generator 750 includes a differential amplifier 810, a selection signal generator 830, a control signal generator 850, and a bulk voltage generator 870.

The differential amplifier 810 differentially amplifies a first voltage VDDBR and a second voltage VDDext and then outputs the amplified voltage. The first voltage VDDBR is applied to a negative ('−') input terminal of the differential amplifier 810, and the second voltage VDDext is applied to a positive ('+') input terminal of the differential amplifier 810. However, the embodiments of the inventive concept are not limited thereto, and the same effect as an effect obtained when the first voltage VDDBR and the second voltage VDDext are respectively applied to the '−' input terminal an the '+' input terminal of the differential amplifier 810 may be obtained through a circuit modified so that the first voltage VDDBR and the second voltage VDDext are respectively applied to the '+' input terminal an the '−' input terminal of the differential amplifier 810. The differential amplifier 810 outputs an output signal DA_OUT having a voltage that is equal to a bulk voltage VBULK or a ground voltage VSS.

The selection signal generator 830 generates and outputs a selection signal SEL based on the priority information PR stored in the register 710, the first voltage VDDBR, and the second voltage VDDext. The selection signal generator 830 generates and outputs the selection signal SEL allowing the control signal generator 850 to select a first input signal corresponding to the priority information PR when both the contactless mode and the contact mode are performed. An operation of the selection signal generator 830 according to an embodiment of the inventive concept is described below in detail with reference to FIGS. 9A and 9B.

The control signal generator 850 selects and outputs either the first input signal corresponding to the priority information PR or the output signal DA_OUT received from the differential amplifier 810 according to the selection signal SEL, and inverts and outputs the selected signal. The selected signal selected by the control signal generator 850 includes the second control signal CON_2, and an inverted signal of the selected signal includes the first control signal CON_1.

The control signal generator 850 includes a multiplexer 853 and an inverter 855. The multiplexer 853 selects the first or second input signal according to the selection signal SEL, and outputs the selected first or second input signal as the second control signal CON_2. The inverter 855 inverts the second control signal CON_2 and then outputs the first control signal CON_1. Each of the first control signal CON_1 and the second control signal CON_2 has the bulk voltage VBULK or a ground voltage VSS as described above with reference to FIGS. 3 and 4.

An operation of the control signal generator 850 according to an embodiment of the inventive concept is described below in detail with reference to FIGS. 9A and 9B.

The bulk voltage generator 870 outputs the first voltage VDDBR or the second voltage VDDext as the bulk voltage VBULK according to the first control signal CON_1 received from the inverter 855 of the control signal generator 850 and the second control signal CON_2 received from the multiplexer 853 of the control signal generator 850. The bulk voltage generator 870 includes a first switch SW1 and a second switch SW2. The first switch SW1 controls the first voltage application unit 110 and an output terminal of the bulk voltage generator 870 to be connected or disconnected to/from each other according to the first control signal CON_1. The second switch SW2 controls the second voltage application unit 120 and the output terminal of the bulk voltage generator 870 to be connected or disconnected to/from each other according to the second control signal CON_2.

For example, in the contactless mode, the first switch SW1 connects the first voltage application unit 110 to the output terminal of the bulk voltage generator 870 according to the first control signal CON_1, and the second switch SW2 disconnects the second voltage application unit 120 from the output terminal of the bulk voltage generator 870 according to the second control signal CON_2. As a consequence, the bulk voltage generator 870 outputs the first voltage VDDBR as the bulk voltage VBULK. As another example, in the contact mode, the first switch SW1 disconnects the first voltage application unit 110 from the output terminal of the bulk voltage generator 870 according to the first control signal CON_1, and the second switch SW2 connects the second voltage application unit 120 to the output terminal of the bulk voltage generator 870 according to the second control signal CON_2. As a result, the bulk voltage generator 870 outputs the second voltage VDDext as the bulk voltage VBULK. As another example, when the contactless mode has priority and only the contactless mode is performed or both the contactless mode and the contact mode are performed, the bulk voltage generator 870 outputs the first voltage VDDBR as the bulk voltage VBULK as in the contactless mode. When the contact mode has priority and only the contact mode is performed or both the contactless mode and the contact mode are performed, the bulk voltage generator 870 outputs the second voltage VDDext as the bulk voltage VBULK as in the contact mode.

Figure 9A:
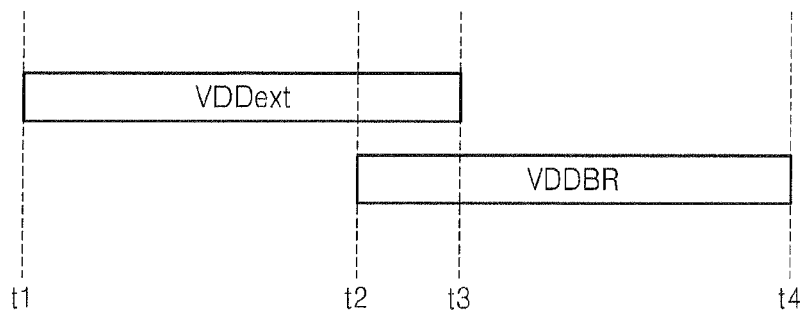
FIG. 9A is a diagram illustrating operations of the selection signal generator and the control signal generator of FIG. 8 according to an embodiment of the inventive concept.

FIG. 9A is a diagram illustrating operations of the selection signal generator 830 and the control signal generator 850 of FIG. 8 according to an embodiment of the inventive concept. Referring to FIGS. 1 and 4 to 9A, from a time point t1 to a time point t2, the second voltage VDDext applies, and the contact mode is thus performed. From the time point t2 to a time point t3, both the first voltage VDDBR and the second voltage VDDext apply and both the contactless mode and the contact mode are thus performed. From the time point t3 to a time point t4, the first voltage VDDBR applies and the contactless mode is thus performed. For purposes of illustration, neither the contact mode nor the contactless mode is performed before the time point t1. For purposes of illustrating, the multiplexer 853 selects a second input signal corresponding to an output signal DA_OUT of the differential amplifier 810 and outputs the second input signal as a second control signal CON_2 according to a selection signal SEL that is in a first logic state, and the multiplexer 853 selects a first input signal corresponding to priority information PR and outputs the first input signal as the second control signal CON_2 according to the selection signal SEL that is in a second logic state. When the contactless mode has priority, the first input signal is the same as a signal corresponding to the output signal DA_OUT of the differential amplifier 810 in the contactless mode. When the contact mode has priority, the second input signal is the same as the signal corresponding to the output signal DA_OUT of the differential amplifier 810 in the contact mode.

An example where the contactless mode has priority is described. At the time point t1, the second voltage VDDext is applied and the contact mode starts. However, since the contact mode has no priority, the selection signal generator 830 outputs the selection signal SEL that is in the first logic state, the multiplexer 853 selects the second input signal and outputs the second input signal as the second control signal CON_2, and the inverter 855 inverts the second control signal CON_2 and outputs the inverted voltage as a first control signal CON_1.

At the time point t2 the second voltage VDDext still applies, and the first voltage VDDBR begins to apply, so that both the contactless mode and the contact mode are performed. The contactless mode has priority. As a consequence, between the time points t2 and t3, the selection signal generator 830 outputs the selection signal SEL that is in the second logic state, the multiplexer 853 selects the first input signal and outputs the first input signal as the second control signal CON_2, and the inverter 855 inverts the second control signal CON_2 and outputs a result of the inverting as the first control signal CON_1.

After the time point t3, the contact mode ends, the contactless mode is still being performed, and the contactless mode has priority. As a consequence, the selection signal generator 830 outputs the selection signal SEL that is in the first or second logic state. The first input signal and the second input signal have the same voltage, and thus, the same result is obtained regardless of whether the control signal generator 850 selects the first input signal or the second input signal. When the selection signal generator 830 outputs the selection signal SEL that is in the first logic state, the multiplexer 853 selects the second input signal and outputs the second input signal as the second control signal CON_2, and the inverter 855 outputs the inverted signal of the second control signal CON_2 as the first control signal CON_1. When the selection signal generator 830 outputs the selection signal SEL that is in the second logic state, the multiplexer 853 selects the first input signal and outputs the first input signal as the second control signal CON_2, and the inverter 855 outputs the inverted signal of the second control signal CON_2 as the first control signal CON_1.

An example where the contact mode has priority is described. At the time point t1, the second voltage VDDext is applied and the contact mode starts. The contact mode has priority The selection signal generator 830 selects the selection signal that is in the first or second logic state. The first input signal and the second input signal have the same voltage, and thus, the same result is obtained regardless of whether the control signal generator 850 selects the first input signal or the second input signal. When the selection signal generator 830 outputs the selection signal SEL that is in the first logic state, the multiplexer 853 selects the second input signal and outputs the second input signal as the second control signal CON_2 and the inverter 855 outputs the result of inverting the second control signal CON_2 as the first control signal CON_1. When the selection signal generator 830 outputs the selection signal SEL that is in the second logic state, the multiplexer 853 selects the first input signal and outputs the first input signal as the second control signal CON_2 and the inverter 855 outputs the inverted signal of the second control signal CON_2 as the first control signal CON_1.

At the point of time t2, the second voltage VDDext is still applied, and the first voltage VDDBR begins to apply, so that both the contactless mode and the contact mode are performed. The contact mode has priority. As a consequence, between the points of time t2 and t3, the selection signal generator 830 outputs the selection signal SEL that is in the second logic state, the multiplexer 853 selects the first input signal and outputs the first input signal as the second control signal CON_2, and the inverter 855 outputs an inverted signal of the second control signal CON_2 as the first control signal CON_1.

After the point of time t3, the contact mode ends, and the contactless mode is still performed. The contactless mode has no priority. As a consequence, the selection signal generator 830 outputs the selection signal that is in the first logic state, the multiplexer 835 selects the second input signal and outputs the second input signal as the second control signal CON_2, and the inverter 855 outputs the inverted signal of the second control signal CON_2 as the first control signal CON_1.

Figure 9B:
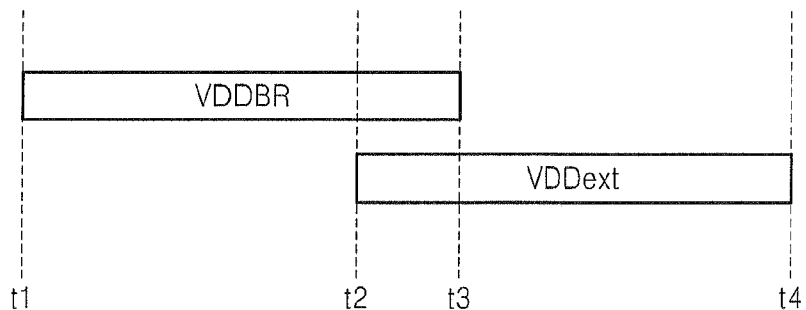
FIG. 9B is a diagram illustrating operations of the selection signal generator and the control signal generator of FIG. 8 according to an embodiment of the inventive concept.

FIG. 9B is a diagram illustrating operations of the selection signal generator 830 and the control signal generator 850 of FIG. 8 according to an embodiment of the inventive concept. Referring to FIGS. 1, 4 to 8, and 9B, during a time period from a time point t1 to a time point t2, the first voltage VDDBR applies and the contactless mode is thus performed. From the time point t2 to a time point t3, both the first voltage VDDBR and the second voltage VDDext apply and both the contactless mode and the contact mode are thus performed. From the time point t3 to a time point t4, the second voltage VDDext applies and the contact mode is performed. For purposes of illustration, neither the contact mode nor the contactless mode is performed before the time point t1. For purposes of illustration, the multiplexer 853 selects a second input signal corresponding to an output signal DA_OUT of the differential amplifier 810 and outputs the second input signal as a second control signal CON_2 according to a selection signal SEL that is a first logic state, and the multiplexer 853 selects a first input signal corresponding to priority information PR and outputs the first input signal as the second control signal CON_2 according to the selection signal SEL that is a second logic state. When the contactless mode has priority, the first input signal is the same as a signal corresponding to the output signal DA_OUT of the differential amplifier 810 in the contactless mode. When the contact mode has priority, the second input signal is the same as the signal corresponding to the output signal DA_OUT of the differential amplifier 810 in the contact mode.

An example where the contactless mode has priority is described. Since at the time point t1, the first voltage VDDBR is applied and starts the contactless mode and the contactless mode has priority, the selection signal generator 830 selects the selection signal that is in the first or second logic state. The first input signal and the second input signal have the same voltage, and thus, the same result is obtained regardless of whether the control signal generator 850 selects the first input signal or the second input signal. When the selection signal generator 830 outputs the selection signal SEL that is in the first logic state, the multiplexer 853 selects the second input signal and outputs the second input signal as the second control signal CON_2, and the inverter 855 outputs the inverted signal of the second control signal CON_2 as the first control signal CON_1. When the selection signal generator 830 outputs the selection signal SEL that is in the second logic state, the multiplexer 853 selects the first input signal and outputs the first input signal as the second control signal CON_2, and the inverter 855 outputs the inverted signal of the second control signal CON_2 as the first control signal CON_1.

Although at the point of time t2, the first voltage VDDBR is still applied, the second voltage VDDext begins to apply, so that both the contactless mode and the contact mode are performed. The contactless mode has priority. Between the time points t2 and t3, the selection signal generator 830 outputs the selection signal SEL that is in the second logic state, the multiplexer 853 selects the first input signal and outputs the first input signal as the second control signal CON_2, and the inverter 855 outputs an inverted signal of the second control signal CON_2 as the first control signal CON_1.

After the time point t3, the contactless mode ends, the contact mode is still performed, and the contact mode has no priority. As a consequence, the selection signal generator 830 outputs the selection signal that is in the first logic state, the multiplexer 835 selects the second input signal and outputs the second input signal as the second control signal CON_2, and the inverter 855 outputs the inverted signal of the second control signal CON_2 as the first control signal CON_1.

An example where the contact mode has priority is described. At the time point t1, the first voltage VDDBR is applied and starts the contactless mode. However, since the contactless mode has no priority, the selection signal generator 830 outputs the selection signal SEL that is in the first logic state, the multiplexer 853 selects the second input signal and outputs the second input signal as the second control signal CON_2, and the inverter 855 outputs an inverted signal of the second control signal CON_2 as the first control signal CON_1.

Although at the point of time t2, the first voltage VDDBR is still applied, the second voltage VDDext begins to apply, so that both the contactless mode and the contact mode are performed. The contact mode has priority. As a consequence, between the time points t2 and t3, the selection signal generator 830 outputs the selection signal SEL that is in the second logic state, the multiplexer 853 selects the first input signal and outputs the first input signal as the second control signal CON_2, and the inverter 855 outputs an inverted signal of the second control signal CON_2 as the first control signal CON_1.

After the time point t3, the contactless mode ends, the contact mode is still performed, and the contact mode has priority. As a consequence, the selection signal generator 830 outputs the selection signal SEL that is in the first or second logic state. The first input signal and the second input signal have the same voltage, and thus, the same result is obtained regardless of whether the control signal generator 850 selects the first input signal or the second input signal. When the selection signal generator 830 outputs the selection signal SEL that is in the first logic state, the multiplexer 853 selects the second input signal and outputs the second input signal as the second control signal CON_2, and the inverter 855 outputs a result of inverting the second control signal CON_2 as the first control signal CON_1. When the selection signal generator 830 outputs the selection signal SEL that is in the second logic state, the multiplexer 853 selects the first input signal and outputs the first input signal as the second control signal CON_2, and the inverter 855 outputs an inverted signal of the second control signal CON_2 as the first control signal CON_1.

Figure 10:
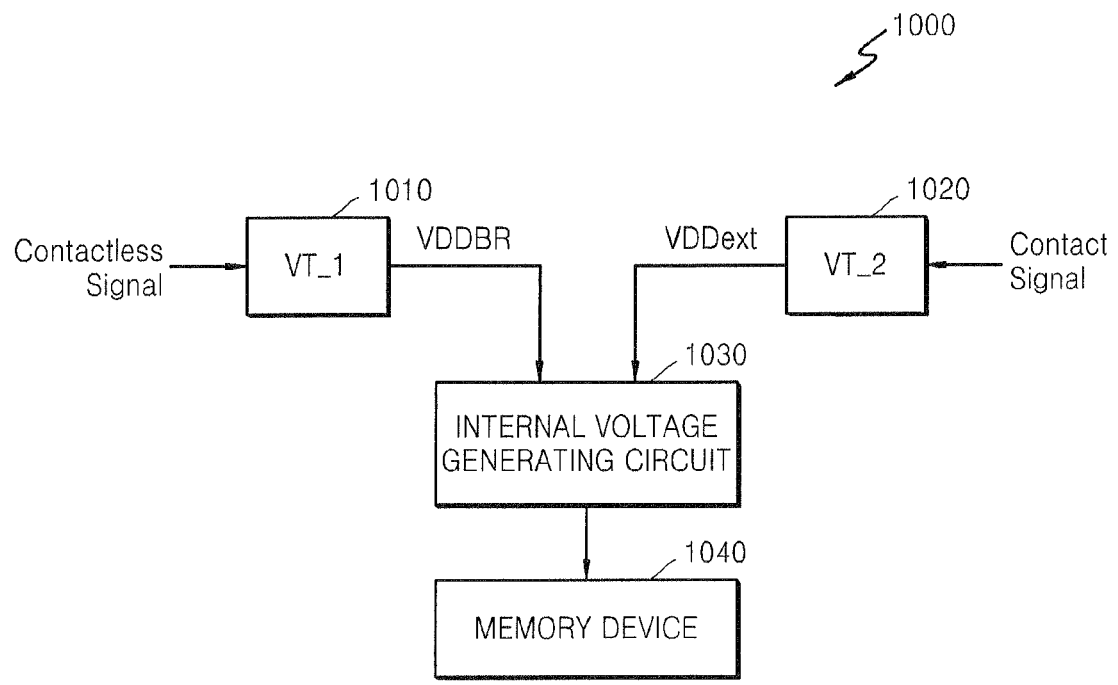
FIG. 10 is a block diagram illustrating a smart card according to an embodiment of the inventive concept.

FIG. 10 is a block diagram illustrating a smart card 1000 according to an embodiment of the inventive concept. Referring to FIGS. 1 to 10, the smart card 1000 includes a first voltage application unit 1010, a second voltage application unit 1020, an internal voltage generating circuit 1030, and a memory device 1040.

The first voltage application unit 1010 applies a first voltage VDDBR that is higher in the contactless mode than in the contact mode. The first voltage application unit 1010 is the same or similar to the first voltage application unit 110 included in the internal voltage generating circuit 100 of FIG. 1.

The second voltage application unit 1020 applies a second voltage VDDext that is higher in the contact mode than in the contactless mode. The second voltage application unit 1020 is the same or similar to the second voltage application unit 120 included in the internal voltage generating circuit 100 of FIG. 1.

In the contactless mode, the internal voltage generating circuit 1030 generates a first internal voltage VINT_1 from a first control signal CON_1 and a second control signal CON_2 and then outputs the first internal voltage VINT_1 to the memory device 1040. In the contact mode, the internal voltage generating circuit 1030 generates a second internal voltage VINT_2 from the first and second voltages VDDBR and VDDext and then outputs the second internal voltage VINT_2 to the memory device 1040. The internal voltage generating circuit 1030 includes the first regulator 130, the second regulator 140, and the controller 150 illustrated in FIG. 1, and generates the first and second internal voltages VINT_1 and VINT_2 as described above with reference to FIGS. 1 to 9B. The internal voltage generating circuit 1030 is the same or substantially the same as the internal voltage generating circuit 100 described in connection with FIGS. 1 to 9B.

The memory device 1040 operates according to the first or second internal voltage VINT_1 or VINT_2. Specifically, the memory device 1040 operates according to the first internal voltage VINT_1 in the contactless mode and operates according to the second internal voltage VINT_2 in the contact mode.

Exemplary embodiments of the inventive concept are disclosed in the drawings and the specification. The specific terms used in the present disclosure are not intended to restrict the scope of the embodiments of the inventive concept and only used for a better understanding of the embodiments of the inventive concept. While the inventive concept has been particularly shown and described with reference to the exemplary embodiments thereof, it will be understood that various changes in form and details may be made therein without departing from the spirit and scope of the following claims.

What is claimed is:

1. An internal voltage generating circuit configured to generate and output a first internal voltage in a contactless mode and to generate and output a second internal voltage in a contact mode, the internal voltage generating circuit comprising:
    a first voltage application unit configured to apply a first voltage that is higher in the contactless mode than in the contact mode;
    a second voltage application unit configured to apply a second voltage that is higher in the contact mode than in the contactless mode;
    a controller configured to generate a bulk voltage, a first control signal, and a second control signal based on the first and second voltages;
    a first regulator configured to be enabled or disabled according to the first control signal, wherein the first regulator is configured to generate and output the first internal voltage based on the bulk voltage, the first voltage, and a first reference voltage; and
    a second regulator configured to be enabled or disabled according to the second control signal, wherein the second regulator is configured to generate and output the second internal voltage based on the bulk voltage, the second voltage, and a second reference voltage, wherein the first regulator comprises;
        a first resistor unit connected between an output terminal of the internal voltage generating circuit and a ground voltage source, wherein the first resistor unit is configured to divide the first internal voltage;
        a first differential amplifier configured to differentially amplify the first reference voltage and a divided voltage of the first internal voltage and to output an amplified voltage;
        a first voltage controller configured to control the first voltage application unit and the output terminal of the internal voltage generating circuit to be connected or disconnected to/from each other according to an output signal of the first differential amplifier or the bulk voltage; and
        a first switch unit configured to enable or disable the first differential amplifier and the first voltage controller and to control the first resistor unit and the ground voltage source to be connected or disconnected to/from each other according to the first control signal, wherein the first switch unit comprises:
            a first switch configured to control the first differential amplifier and the ground voltage source to be connected or disconnected to/from each other according to the first control signal;
            a second switch configured to control the bulk voltage to be applied or not to be applied to the first voltage controller according to the first control signal; and
            a third switch configured to control the first resistor unit and the ground voltage source to be connected or disconnected to/from each other according to the first control signal, wherein the first differential amplifier comprises:
            a first PMOS transistor including a first terminal, a second terminal, a gate, wherein the first voltage is applied to the first terminal of the first PMOS transistor, and wherein the second terminal and the gate of the first PMOS transistor are connected to each other;
            a second PMOS transistor including s first terminal, a second terminal, and a gate, wherein the first voltage is applied to the first terminal of the second PMOS transistor, wherein the second terminal of the second PMOS transistor is connected to an output terminal of the first differential amplifier, and wherein the gate of the second PMOS transistor is connected to the gate of the first PMOS transistor;
            a first NMOS transistor including a first terminal, a second terminal, and a gate, wherein the first terminal of the first NMOS transistor is connected to the second terminal of the first PMOS transistor, wherein the second terminal of the first NMOS transistor is connected to the first switch, and wherein the divided voltage of the first internal voltage is applied to the gate of the first NMOS transistor; and
            a second NMOS transistor including a first terminal a second terminal, and a gate, wherein the first terminal of the second NMOS transistor is connected to the output terminal of the first differential amplifier, wherein the second terminal of the second NMOS transistor is connected to the first switch, and wherein the first reference voltage is applied to the gate of the second NMOS transistor,
    wherein the first switch unit further comprises a forth switch configured to control the bulk voltage to be applied or not to be applied to the gates of the first and second PMOS transistors according to the first control signal.

2. The internal voltage generating circuit of claim 1, wherein the controller comprises:
    a differential amplifier configured to differentially amplify the first and second voltages and output an amplified voltage as the second control signal;
    an inverter configured to invert, the second control signal and output an inverted signal as the first control signal; and
    a bulk voltage generator configured to output the first voltage as the bulk voltage according to the first control signal in the contactless mode and to output the second voltage as the bulk voltage according to the second control signal in the contact mode.

3. The internal voltage generating circuit of claim 1, wherein the second regulator comprises:
    a second resistor unit connected between an output terminal of the internal voltage generating circuit and a ground voltage source, wherein the second resistor unit is configured to divide the second internal voltage;

a second differential amplifier configured to differentially amplify the second reference voltage and a divided voltage of the second internal voltage and to output an amplified voltage;

a second voltage controller configured to control the second voltage application unit and the output terminal of the internal voltage generating circuit to be connected or disconnected to/from each other according to an output signal of the second differential amplifier or the bulk voltage; and a second switch unit configured to enable or disable the second differential amplifier and the second voltage controller and to control the second resistor unit and the ground voltage source to be connected or disconnected to/from each other according to the second control signal.

4. The internal voltage generating circuit of claim 3, wherein the second switch unit comprises:

a fifth switch configured to control the second differential amplifier and the ground voltage source to be connected or disconnected to/from each other according to the second control signal;

a sixth switch configured to control the bulk voltage to be applied or not to be applied to the first voltage controller according to the second control signal; and a seventh switch configured to control the second resistor unit and the ground voltage source to be connected or disconnected to/from each other according to the second control signal.

5. The internal voltage generating circuit of claim 1, wherein the controller comprises:

a register configured to store priority information indicating whether the contact mode or the contactless mode has priority; and a signal generator configured to output the first voltage or the second voltage as the bulk voltage based on the priority information and to generate and output the first and second control signals based on the first and second voltages and the priority information.

6. The internal voltage generating circuit of claim 5, wherein the signal generator is configured to output the first voltage as the bulk voltage, configured to output the first control signal to enable the first regulator, and configured to output the second control signal to disable the second regulator when the contactless mode is performed with priority, and wherein the signal generator is configured to output the second voltage as the bulk voltage, configured to output the first control signal to disable the first regulator, and configured to output the second control signal to enable the second regulator when the contact mode is performed with priority.

7. The internal voltage generating circuit of claim 5, wherein the signal generator comprises:

a selection signal generator configured to generate a selection signal based on the priority information and the first and second voltages;

a differential amplifier configured to differentially amplify the first and second voltages and output an amplified voltage;

a control signal generator configured to select a first input signal corresponding to the priority information or a second input signal corresponding to an output signal of the differential amplifier according to the selection signal, to output the selected signal as the second control signal, and to output an inverted signal of the selected signal as the first control signal; and a bulk voltage generator configured to output the first voltage as the bulk voltage according to the first control signal when the contactless mode is performed with priority and to output the second voltage as the bulk voltage according to the second control signal when the contact mode is performed with priority.

8. The internal voltage generating circuit of claim 7, wherein the selection signal generator is configured to generate and output the selection signal so that the control signal generator selects the first input signal when both the contactless mode and the contact mode are performed.

9. The internal voltage generating circuit of claim 1, wherein the first voltage application unit is configured to apply the first voltage having a first level in the contactless mode and to apply the first voltage having a second level in the contact mode, wherein the second level is lower than the first level, and wherein the second voltage application unit is configured to apply the second voltage having a third level in the contact mode, wherein the third level is higher than the second level and to apply the second voltage having a fourth level in the contactless mode, wherein the fourth level is lower than the first and third levels.

10. The internal voltage generating circuit of claim. 1, wherein the bulk voltage is substantially the same as the first voltage in the contactless mode, and the bulk voltage is substantially the same as the second voltage in the contact mode.

11. The internal voltage generating circuit of claim 1, wherein in the contactless mode, the first control signal is at a high state, the second control signal is at a low state, and the bulk voltage is substantially the same as the first voltage, and in the contact mode, the first control signal is at a low state, the second control signal is at a high state, and the bulk voltage is substantially the same as the second voltage.

12. An internal voltage generating circuit configured to generate and output a first internal voltage in a contactless mode and to generate and output a second internal voltage in a contact mode, the internal voltage generating circuit comprising:

a first voltage application unit configured to apply a first voltage that is higher in the contactless mode than in the contact mode;

a second voltage application unit configured to apply a second voltage that is higher in the contact mode than in the contactless mode;

a controller configured to generate a bulk voltage, a first control signal, and a second control signal based on the first and second voltages;

a first regulator configured to be enabled or disabled according to the first control signal, wherein the first regulator is configured to generate and output the first internal voltage based on the bulk voltage, the first voltage, and a first reference voltage; and a second regulator configured to be enabled or disabled according to the second control signal, wherein the second regulator is configured to generate and output the second internal voltage based on the bulk voltage, the second voltage, and a second reference voltage, wherein the second regulator comprises:

a second resistor unit connected between an output terminal of the internal voltage generating circuit and a ground voltage source, wherein the second resistor unit is configured to divide the second internal voltage;

a second differential amplifier configured to differentially amplify the second reference voltage and a divided voltage of the second internal voltage and to output an amplified voltage;

a second voltage controller configured to control the second voltage application unit and the output terminal of the internal voltage generating circuit to be connected or disconnected to/from each other according to an output signal of the second differential amplifier or the bulk voltage; and a second switch unit configured to enable or disable the second differential amplifier and the second voltage controller and to control the resistor unit and the ground voltage source to be connected or disconnected to/from each other according to the second control signal, wherein the second switch unit comprises:

a fifth switch configured to control the second differential amplifier and the ground voltage source to be connected or disconnected to/from each other according to the second control signal;

a sixth switch configured to control the bulk voltage to be applied or not to be applied to the first voltage controller according to the second control signal; and a seventh switch configured to control the second resistor unit and the ground voltage source to be connected or disconnected to/from each other according to the second control signal, wherein the second differential amplifier comprises:

a third PMOS transistor including a first terminal, a second terminal, and a gate, wherein the second voltage is applied to the first terminal of the third PMOS transistor, and wherein the second terminal and the gate of the third PMOS transistor are connected to each other;

a fourth PMOS transistor including a first terminal, a second terminal, and a gate, wherein the second voltage is applied to the first terminal of the fourth PMOS transistor, wherein the second terminal of the fourth PMOS transistor is connected to an output terminal of the second differential amplifier, and wherein the gate of the fourth PMOS transistor is connected to the gate of the third PMOS transistor;

a third NMOS transistor including a first terminal, a second terminal, and a gate, wherein the first terminal of the third NMOS transistor is connected to the second terminal of the third PMOS transistor, wherein the second terminal of the third NMOS transistor is connected to the fifth switch, and wherein the divided voltage of the second internal voltage is applied to the gate of the third NMOS transistor; and a fourth NMOS transistor including a first terminal, a second terminal, and a gate, wherein the first terminal of the fourth NMOS transistor is connected to the output terminal of the second differential amplifier, wherein the second terminal of the fourth NMOS transistor is connected to the fifth switch, and wherein the second reference voltage is applied to the gate of the fourth NMOS transistor, and wherein the second switch unit further comprises an eighth switch configured to control the bulk voltage to be applied or not to be applied to the gates of the third and fourth PMOS transistor according to the second control signal.

13. An internal voltage generating circuit configured to generate and output a first internal voltage in a contactless mode and to generate and output a second internal voltage in a contact mode, the internal voltage generating circuit comprising:

a first voltage application unit configured to apply a first voltage that is higher in the contactless mode than in the contact mode;

a second voltage application unit configured to apply a second voltage that is higher in the contact mode than in the contactless mode;

a controller configured to generate a bulk voltage, a first control signal, and a second control signal based on the first and second voltages;

a first regulator configured to be enabled or disabled according to the first control signal, wherein the first regulator is configured to generate and output the first internal voltage based on the bulk voltage, the first voltage, and a first reference voltage; and a second regulator configured to be enabled or disabled according to the second control signal, wherein the second regulator is configured to generate and output the second internal voltage based on the bulk voltage, the second voltage, and a second reference voltage, wherein the controller comprises:

a register configured to store priority information indicating whether the contact mode or the contactless mode has priority; and a signal generator configured to output the first voltage or the second voltage as the bulk voltage based on the priority information and to generate and output the first and second control signals based on the fist and second voltages and the priority information, wherein the signal generator comprises:

a selection signal generator configured to generate a signal based on the priority information and the first and second voltages;

a differential amplifier configured to differentially amplify the first and second voltages and output an amplified voltage;

a control signal generator configured to select a first input signal corresponding to the priority information or a second input signal corresponding to an output signal of the differential amplifier according to the selection signal, to output the signal as the second control signal, and to output an inverted signal of the selected signal as the first control signal; and a bulk voltage generator configured to output the first voltage as the bulk voltage according to the control signal when the contactless mode is performed with priority and to output the second voltage as the bulk voltage according to the second control signal when the contact mode is performed with priority, wherein the control signal generator comprises:

a multiplexer configured to select the first or second input signal according to the selection signal and to output the selected signal as the second control signal; and an inverter configured to invert the second control signal received from the multiplexer and to output an inverted signal as the first control signal.

* * * * *